May 15, 1945. R. ELLERTHORPE 2,376,041
BEAM CLAMP
Filed May 19, 1944
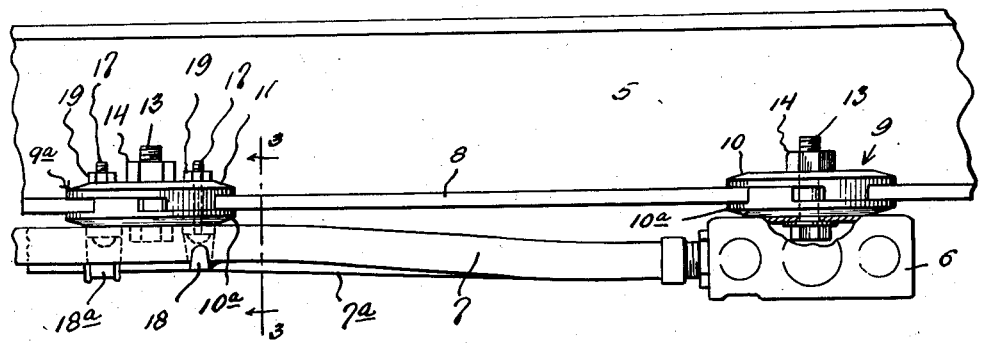
Inventor
Roy Ellerthorpe,
By J. Stanley Burch
Attorney Patented May 15, 1945

2,376,041

UNITED STATES PATENT OFFICE 2,376,041

BEAM CLAMP

Roy Ellerthorpe, Detroit, Mich.

Application May 19, 1944, Serial No. 536,327

2 Claims. (Cl. 248—72)

This invention relates to improvements in clamps for supporting pipes, and electrical conduits and outlet boxes from flanged beams such as are used in building construction.

The primary object of the present invention is to provide a clamp of the above kind which is extremely simple and durable in construction, economical to manufacture, easy to use, and highly efficient in use.

The present invention consists of the novel form, combination and arrangement of parts hereinafter more fully described, shown in the accompanying drawing and claimed.

In the drawing, wherein like reference characters indicate corresponding parts throughout the several views:

Figure 1 is a side elevational view showing an outlet box and electrical conduits supported from an I-beam by means of beam clamps constructed in accordance with the present invention.

Figure 2 is a bottom plan view of the construction shown in Figure 1.

Figure 3 is an enlarged fragmentary vertical section taken on line 3—3 of Figure 1.

Figure 4 is an outer face or plan view of one of the two similar clamping discs forming part of each beam clamp shown in Figure 1.

Figure 5 is an inner face or plan view of the clamping disc shown in Figure 4.

Figure 6 is a section taken on line 6—6 of Figure 4.

Referring in detail to the drawing, 5 indicates an I-beam having an electrical outlet box 6 and conduits 7 and 7a respectively supported from a bottom flange 8 thereof, by means including similar beam clamps 9 and 9a constructed in accordance with the present invention. The conduits are shown as coupled to the outlet box and extending substantially parallel with the I-beam.

The present beam clamp embodies two similar clamping disks 10 and 10a each having a central opening 11 and provided with a lateral annular marginal flange 12 that is narrow and tapered to a thin edge to bite into the beam flange when the discs are drawn tightly together. A bolt 13 is passed through the openings 11 of the discs 10 and 10a, and has a nut 14 threaded thereon for drawing the discs together. Each disc of the clamp has a flat-faced lateral lug 15 that projects from the marginal thereof and is somewhat thicker than the flange 12. Thus, when the discs 10 and 10a are respectively disposed with their marginal portions, which are substantially diametrically opposite the lugs 15, above and below the beam flange 8 the lug 15 of each clamping disc will contact the other clamping disc to space them at points remote from the beam flange. The lugs thus afford leverage in drawing the discs together at the points opposite to said lugs, whereby the flanges 12 of said discs may be readily drawn into tight clamping engagement with the beam flange. Each clamping disc has four equally spaced openings 16 adjacent the margin thereof. As shown in Figures 1 and 2, the bolt 13 of clamp 9 may be passed through a central opening in the top wall of outlet box 6 to tightly secure the latter to the disc 10a of said clamp and thereby rigidly support said outlet box when the clamp is applied to the I-beam. As is also shown in Figures 1 to 3 inclusive, bolts 17 may be passed through diametrically opposed ones of the openings of the discs 10 and 10a of the clamp 9a, and through clamping lugs 18 and 18a which partially embrace the respective conduits 7 and 7a, nuts 19 being threaded on the bolts 17 to draw the lugs 18 and 18a into tight engagement with the conduits for firmly clamping the latter to the disc 10a. The bolts 17 may be used in the other two openings 16 of each disc 10 and 10a for utilizing the clamping lugs 18 and 18a in supporting pipes or conduits that extend across the I-beam substantially at right angles to the latter.

From the foregoing description, it will be seen that the present clamp is such as to effectively carry out the stated objects of the invention. Minor changes in the details shown and described are contemplated, such as fall within the spirit and scope of the invention as claimed.

What I claim is:

1. A beam clamp comprising similar upper and lower circular clamping discs having central openings, and a nutted clamping bolt passing through said openings for drawing the discs toward each other, each of said discs having a flat-faced lug projecting from the margin thereof and adapted to contact the adjacent face of the other disc to space the discs at one side of said bolt, said discs further having marginal flanges projecting toward each other and tapered to thin edges to bite into a beam flange interposed between said discs at the opposite side of said bolt.

2. The construction defined in claim 1, wherein said discs are provided with a plurality of equally spaced openings therethrough adjacent the margins thereof in combination with further nutted bolts passing through the latter openings of both discs, and clamping lugs carried by the latter bolts beneath the lower disc and coacting with the latter to clamp and support conduits from the beam.

ROY ELLERTHORPE.